(12) United States Patent
Seok

(10) Patent No.: US 9,655,144 B2
(45) Date of Patent: May 16, 2017

(54) METHOD AND DEVICE FOR CONTROLLING CHANNEL ACCESS IN WIRELESS LAN SYSTEM

(71) Applicant: LG ELECTRONICS INC., Seoul (KR)

(72) Inventor: Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 14/389,664

(22) PCT Filed: Apr. 1, 2013

(86) PCT No.: PCT/KR2013/002693
§ 371 (c)(1),
(2) Date: Sep. 30, 2014

(87) PCT Pub. No.: WO2013/147567
PCT Pub. Date: Oct. 3, 2013

(65) Prior Publication Data
US 2015/0071204 A1 Mar. 12, 2015

Related U.S. Application Data

(60) Provisional application No. 61/617,666, filed on Mar. 30, 2012.

(51) Int. Cl.
*H04W 74/04* (2009.01)
*H04W 74/08* (2009.01)
(Continued)

(52) U.S. Cl.
CPC .......... *H04W 74/04* (2013.01); *H04B 7/0452* (2013.01); *H04B 7/0617* (2013.01); *H04W 74/08* (2013.01); *H04W 84/12* (2013.01)

(58) Field of Classification Search
None
See application file for complete search history.

(56) References Cited

U.S. PATENT DOCUMENTS

2005/0105504 A1* 5/2005 Sakoda ................ H04L 1/0002
370/349
2006/0045083 A1* 3/2006 Hasty .................... H04W 16/14
370/389

(Continued)

FOREIGN PATENT DOCUMENTS

KR 10-2007-0020033 2/2007
KR 10-0938791 1/2010

(Continued)

OTHER PUBLICATIONS

PCT International Application No. PCT/KR2013/002693, Written Opinion of the International Searching Authority dated Jul. 29, 2013, 1 page.

*Primary Examiner* — Hassan Phillips
*Assistant Examiner* — Duc Duong
(74) *Attorney, Agent, or Firm* — Lee Hong Degerman Kang & Waimey

(57) ABSTRACT

The present invention relates to a wireless communication system and, more specifically, to a method and apparatus for controlling a channel access in a wireless LAN system. According to one embodiment of the present invention, the objective of the present invention is to provide a method for controlling a channel access in a station (STA) of the wireless communication system comprising the steps of: receiving a frame which includes a response frame indication field in a physical layer convergence protocol (PLCP) header of the frame; and deferring the channel access of the STA during a predetermined period of time which is determined on the basis of the response frame indication field.

13 Claims, 23 Drawing Sheets

(51) Int. Cl.
*H04B 7/0452* (2017.01)
*H04B 7/06* (2006.01)
*H04W 84/12* (2009.01)

(56) References Cited

U.S. PATENT DOCUMENTS

| | | | |
|---|---|---|---|
| 2006/0126545 A1* | 6/2006 | Nanda | H04B 17/382 370/310 |
| 2006/0268881 A1* | 11/2006 | Moreton | H04W 74/0816 370/394 |
| 2007/0115882 A1* | 5/2007 | Wentink | H04N 21/4126 370/329 |
| 2007/0160021 A1* | 7/2007 | Xhafa | H04W 74/04 370/338 |
| 2007/0171933 A1 | 7/2007 | Sammour et al. | |
| 2011/0222429 A1* | 9/2011 | Ito | H04L 27/2613 370/252 |
| 2012/0163292 A1* | 6/2012 | Kneckt | H04W 52/0229 370/328 |
| 2012/0224521 A1* | 9/2012 | Zhu | H04W 52/0216 370/311 |
| 2012/0327870 A1* | 12/2012 | Grandhi | H04W 28/06 370/329 |
| 2013/0155953 A1* | 6/2013 | Chu | H04W 28/20 370/328 |

FOREIGN PATENT DOCUMENTS

| | | |
|---|---|---|
| KR | 10-2010-0129787 | 12/2010 |
| WO | 2011/159831 | 12/2011 |

\* cited by examiner

FIG. 17
(a) 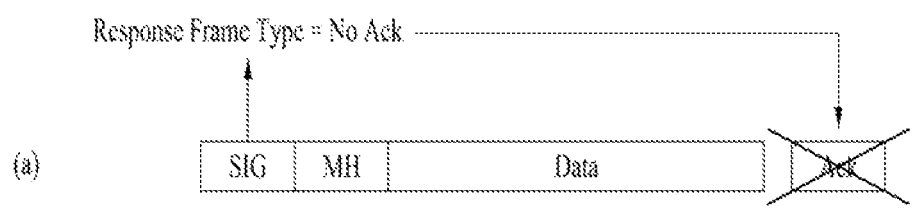
(b) 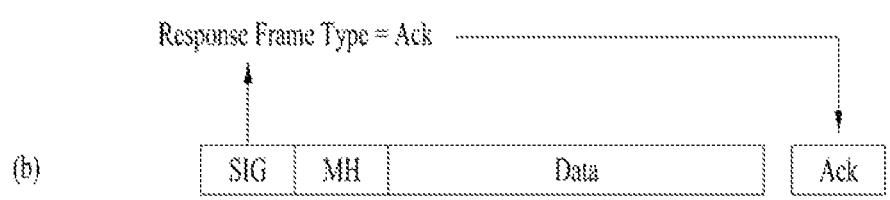
(c) 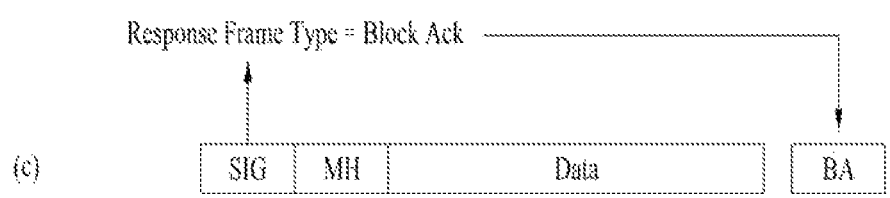

METHOD AND DEVICE FOR CONTROLLING CHANNEL ACCESS IN WIRELESS LAN SYSTEM

CROSS-REFERENCE TO RELATED APPLICATIONS

This application is the National Stage filing under 35 U.S.C. 371 of International Application No. PCT/KR2013/002693, filed on Apr. 1, 2013, which claims the benefit of U.S. Provisional Application Ser. No. 61/617,666, filed on Mar. 30, 2012, the contents of which are hereby incorporated by reference herein in their entirety.

TECHNICAL FIELD

The following description relates to a wireless communication system and, more particularly, to a method and apparatus for controlling channel access in a wireless local area network (LAN) system

BACKGROUND ART

Along with the development of information and communication technology, various wireless communication technologies have been developed. Thereamong, wireless local area network (WLAN) enables users to wirelessly access the Internet through their portable terminals such as personal digital assistants (PDAs), laptop computers, and portable multimedia players (PMPs) in homes, offices, or specific service areas, based on wireless frequency technology.

To overcome limits to communication speed, which are a weakness of WLAN, systems for increasing speed and reliability of a network and extending wireless network coverage have been introduced in recent technology standards. For example, IEEE 802.11n supports a high throughput (HT) of a data processing rate of up to 540 Mbps or higher and adopts multiple input multiple output (MIMO) technology in both a transmitter and a receiver in order to minimize transmission errors and optimize data rate.

DISCLOSURE

Technical Problem

As next-generation communication technology, machine-to-machine (M2M) communication technology has been discussed. In an IEEE 802.11 WLAN system, a technology standard for supporting M2M communication has been developed as IEEE 802.11ah. A scenario in which devices occasionally exchange less data at low speed in an environment in which many devices are present may be considered in M2M communication.

Communication in the WLAN is performed by a medium shared between all devices. If the number of devices increases as in M2M communication, much time consumption for channel access of one device may cause degradation of system performance and hinder power saving of each device.

An object of the present is to provide a new mechanism for controlling channel access.

The technical objects that can be achieved through the present invention are not limited to what has been particularly described hereinabove and other technical objects not described herein will be more clearly understood by persons skilled in the art from the following detailed description.

Technical Solution

According to an embodiment of the present invention to achieve the technical objects, provided herein is a channel access control method of a station (STA) of a wireless communication system, including receiving a frame, the frame including a physical layer convergence protocol (PLCP) header having a response frame indication field; and deferring channel access of the STA during prescribed time length determined based on the response frame indication field.

According to another embodiment of the present invention to achieve the technical objects, provided herein is a station (STA) for controlling channel access in a wireless communication system, including a transceiver module; and a processor, wherein the processor is configured to receive a frame through the transceiver, the frame including a physical layer convergence protocol (PLCP) header having a response frame indication field; and defer channel access of the STA during prescribed time length determined based on the response frame indication field.

In the embodiments according to the present invention, the following may be commonly applied.

The response frame indication field may indicate a type of a response frame transmitted after the frame.

The response frame indication field may be included in a signal (SIG) field of the PLCP header.

If the frame supports multiuser-multiple input multiple output (MU-MIMO), the response frame indication field may be included in a field commonly received by a plurality of STAs.

The field commonly received by the STAs may be a PLCP SIG-A field.

The response frame indication field may be set to a value indicating a response frame type having longest length among respective response frame types for the STAs.

An acknowledgement (ACK) policy field for each of the STAs may be included in a field individually received by each of the STAs in the frame supporting MU-MIMO.

The field individually received by each of the STAs may be a PLCP SIG-B field.

A type of a response frame may include at least one of a first type related to a No response, a second type related to a short response, a third type related to a normal response, and a fourth type related to a long response.

If the type of the response frame is the first type, the prescribed time length may be set to 0, if the type of the response frame is the second type, the prescribed time length may be set to time length corresponding to transmission time length of the PLCP header plus a short interframe space (SIFS), if the type of the response frame is the third type, the prescribed time length may be set to time length corresponding to transmission time length of an acknowledgement (ACK) frame plus the SIFS, or if the type of the response frame is the fourth type, the prescribed time length may be set to time length corresponding to maximum transmission time length of a PLCP packet data unit (PPDU) plus the SIFS.

The field may further include a PLCP signal (SIG) field including a transmission opportunity-end (TXOP-END) bit.

If the frame having the TXOP-END bit set to 1 is received, a network allocation vector (NAV) of the STA may be reset.

The deferring may include resetting the NAV and setting a value of the NAV based on the prescribed time length.

If a duration field included in a medium access control (MAC) header of the frame is received, the prescribed time length may be determined based on the duration field rather than the response frame indication field.

The above overall description and a later detailed description of the present invention are purely exemplary and are given as an additional description of the present invention determined by the appended claims.

Advantageous Effects

According to the present invention, a new mechanism implementation method and device for controlling channel access can be provided.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

FIG. 17 is a diagram for explaining an operation using a response type field according to an example of the present invention.

BEST MODE

Figure 1:
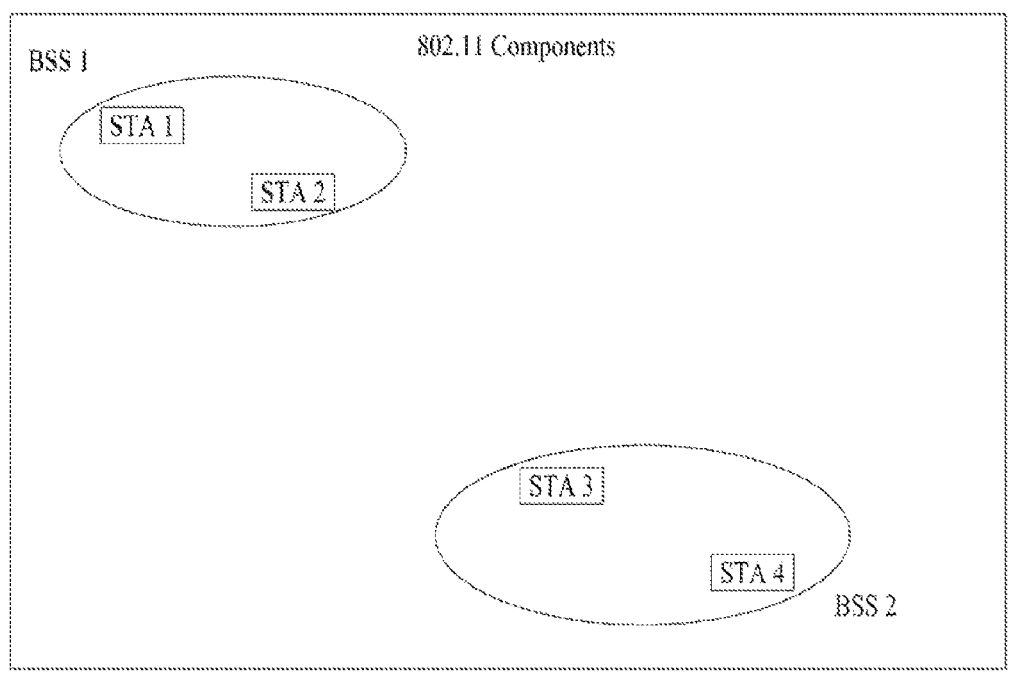
FIG. 1 is a diagram illustrating an exemplary structure of an IEEE 802.11 system to which the present invention is applicable.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
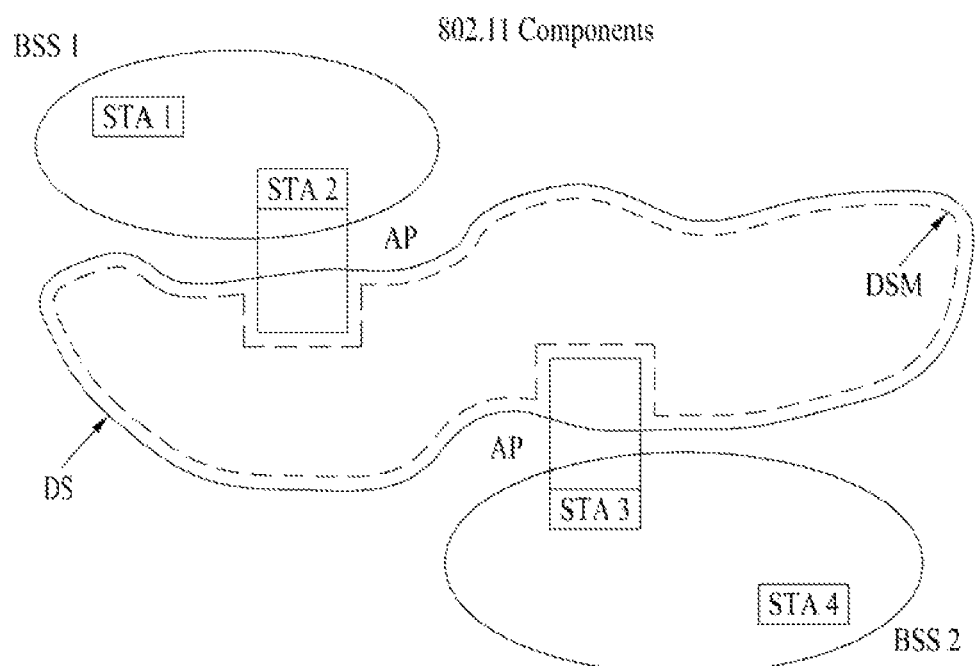
FIG. 2 is a diagram illustrating another exemplary structure of an IEEE 802.11 system to which the present invention is applicable.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
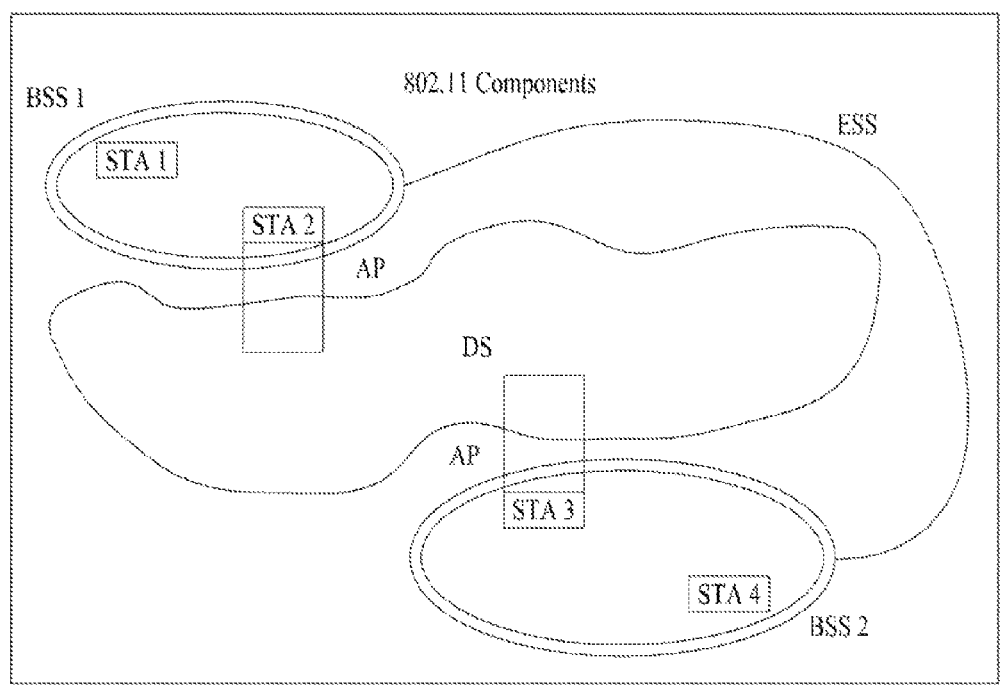
FIG. 3 is a diagram illustrating still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
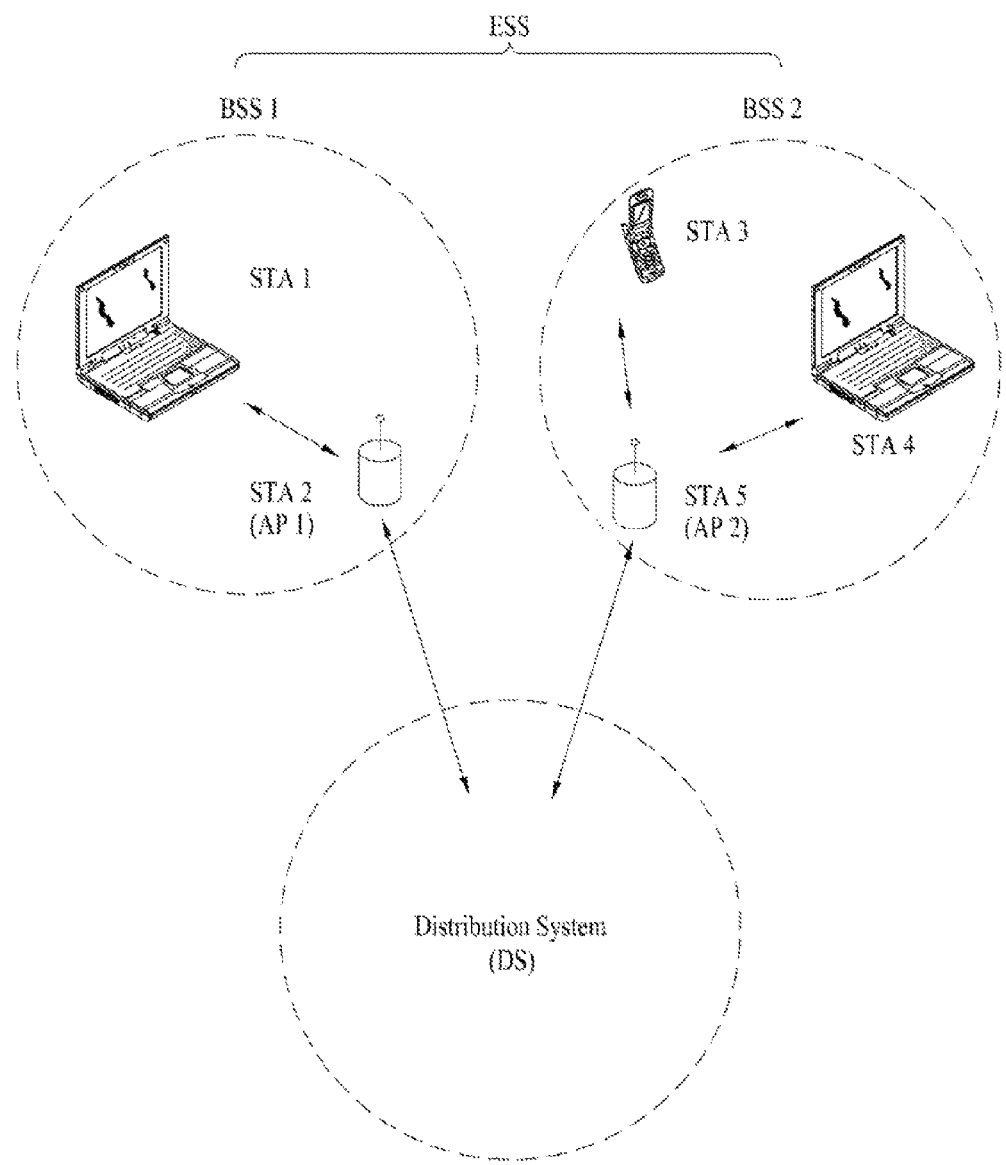
FIG. 4 is a diagram illustrating an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
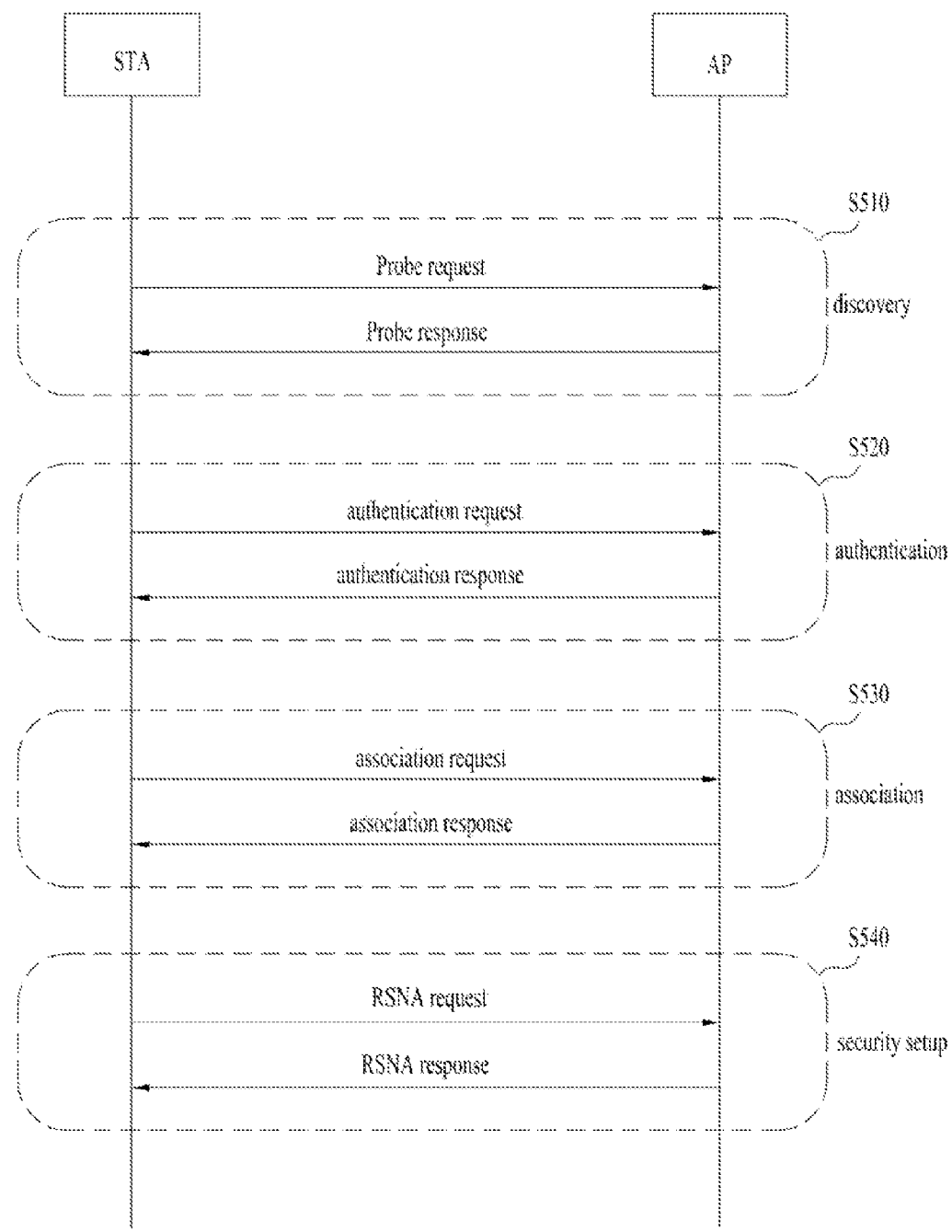
FIG. 5 is a diagram for explaining a link setup process in a WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

With the widespread use of WLAN technology and diversification of WLAN applications, there is a need to develop a new WLAN system capable of supporting a HT higher than a data processing speed supported by IEEE 802.11n. The next generation WLAN system for supporting Very High Throughput (VHT) is the next version (for example, IEEE 802.11ac) of the IEEE 802.11n WLAN system, and is one of IEEE 802.11 WLAN systems recently proposed to support a data process speed of 1 Gbps or more at a MAC SAP (Medium Access Control Service Access Point).

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54~698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). In addition, the STA operates according to a command received via downlink (i.e., a link from the AP to the non-AP STA) in M2M communication, such that data is reported through uplink (i.e., a link from the non-AP STA to the AP). M2M communication is mainly focused upon the communication scheme improved on uplink for transmission of the principal data. In addition, an M2M STA is mainly operated as a battery and the user may feel difficulty in frequently charging the M2M STA with electricity, such that battery consumption is minimized, resulting in an increased battery lifetime. In addition, the user may have difficulty in directly handling the M2M STA in a specific situation, such that a self-recovery function is needed. Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period, and at the same time can reduce power consumption of the STA.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Medium Access Mechanism

In the IEEE 802.11-based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
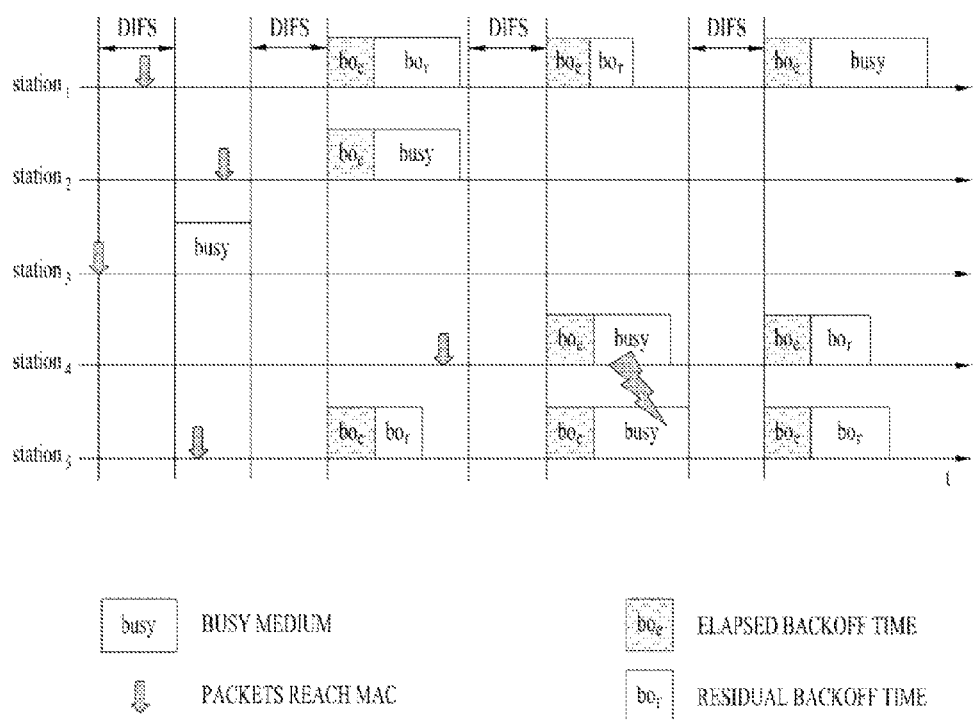
FIG. 6 is a diagram for explaining a backoff process.

FIG. 6 is a conceptual diagram illustrating a backoff process.

Operations based on a random backoff period will hereinafter be described with reference to FIG. 6. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4 , and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit or defer medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
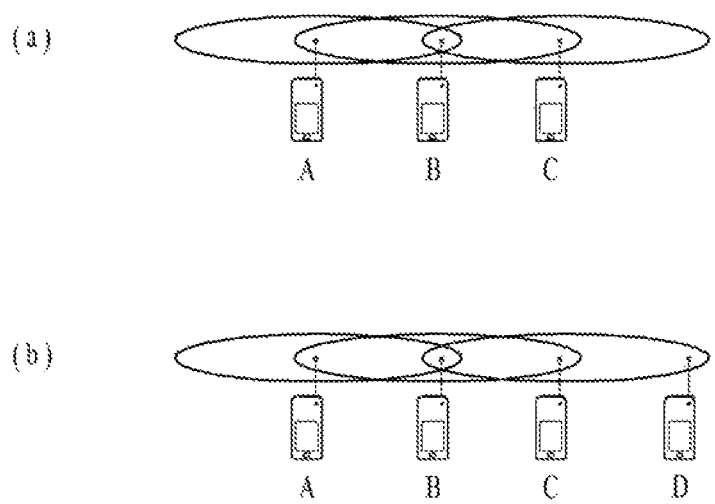
FIG. 7 is a diagram for explaining a hidden node and an exposed node.

FIG. 7 is a conceptual diagram illustrating a hidden node and an exposed node.

FIG. 7(a) exemplarily shows the hidden node. In FIG. 7(a), STA A communicates with STA B, and STA C has information to be transmitted. In FIG. 7(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
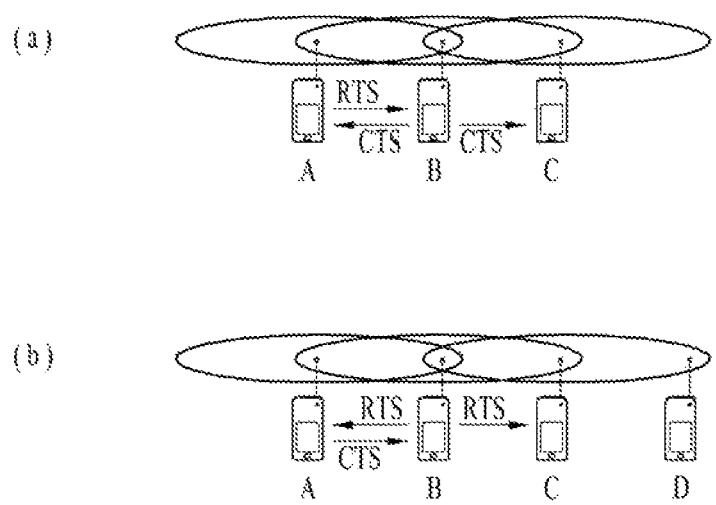
FIG. 8 is a diagram for explaining request to send (RTS) and clear to send (CTS).

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(a) exemplarily shows the method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

Figure 9:
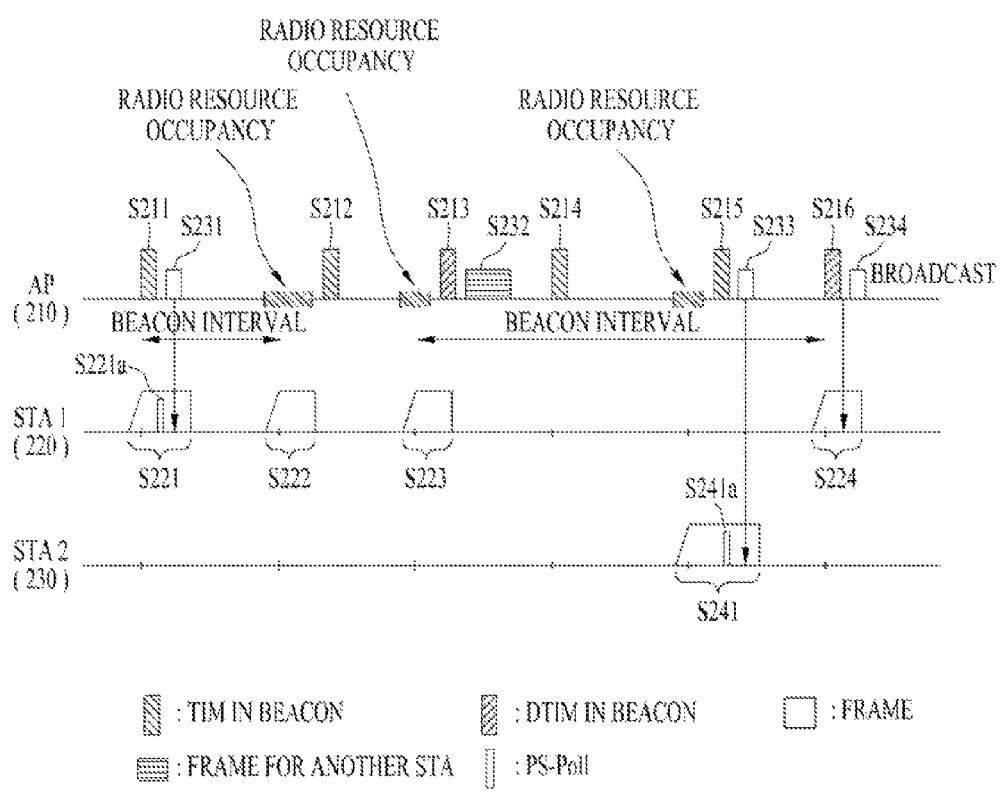
FIG. 9 is a diagram for explaining a power management operation.

FIG. 9 is a conceptual diagram illustrating a power management (PM) operation.

Referring to FIG. 9, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state in step S221 when AP 210 first transmits the beacon frame in step S211. STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 in step S221a. The AP 210 may transmit the frame to STA1 220 in response to the PS-Poll frame in step S231. STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time in step S212. In this case, although STA1 220 is switched to the awake state in response to the beacon interval, it does not receive the delay-transmitted beacon frame so that it re-enters the sleep state in step S222.

When AP 210 thirdly transmits the beacon frame, the corresponding beacon frame may include a TIM element denoted by DTIM. However, since the busy medium state is given, AP 210 transmits the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241a. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
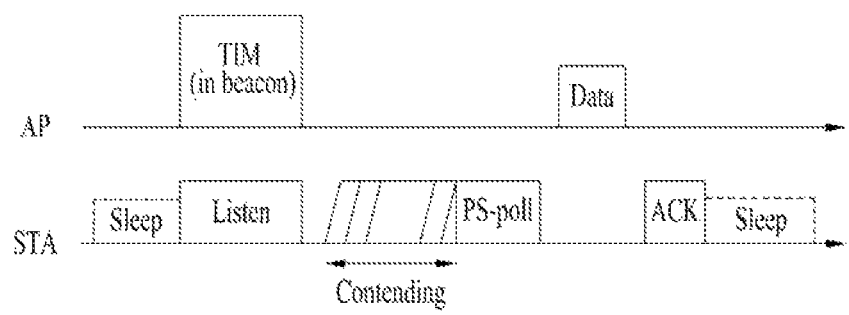
FIGS. 10 to 12 are diagrams for explaining detailed operations of an STA that has received a TIM.
Figure 11:
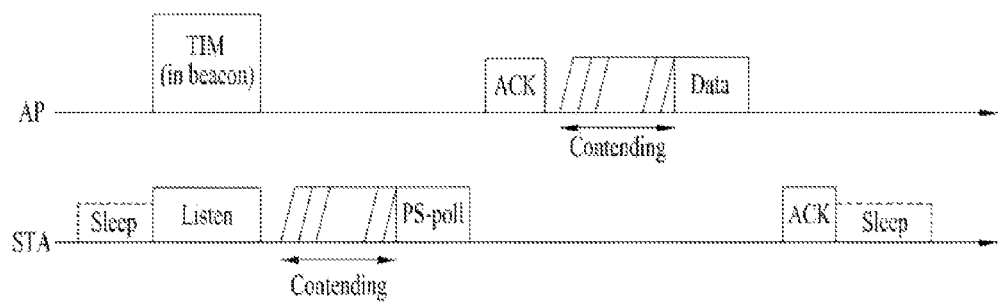
Figure 12:
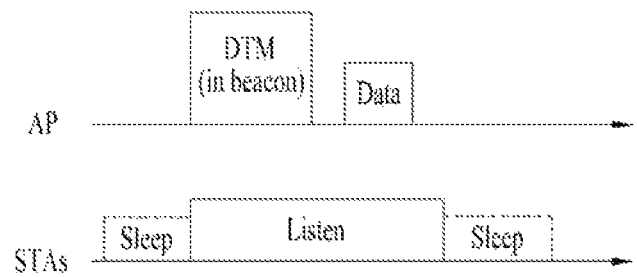

FIGS. 10 to 12 are conceptual diagrams illustrating detailed operations of the STA having received a Traffic Indication Map (TIM).

Referring to FIG. 10, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 12 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

TIM Structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

AID is used as a unique ID of each STA within one BSS. For example, AID for use in the current WLAN system may be allocated to one of 1 to 2007. In the case of the current WLAN system, 14 bits for AID may be allocated to a frame transmitted by AP and/or STA. Although the AID value may be assigned a maximum of 16383, the values of 2008~16383 are set to reserved values.

The TIM element according to legacy definition is inappropriate for application of M2M application through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having an Rx data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a head part of bitmap, and the omitted result may be defined as an offset (or start point) value. However, although STAs each including the buffered frame is small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, the remaining parts other than both edge parts are assigned zero (0). If STAs associated with one AP is small in number, inefficiency of bitmap compression does not cause serious problems. However, if the number of STAs associated with one AP increases, such inefficiency may deteriorate overall system throughput.

Figure 13:
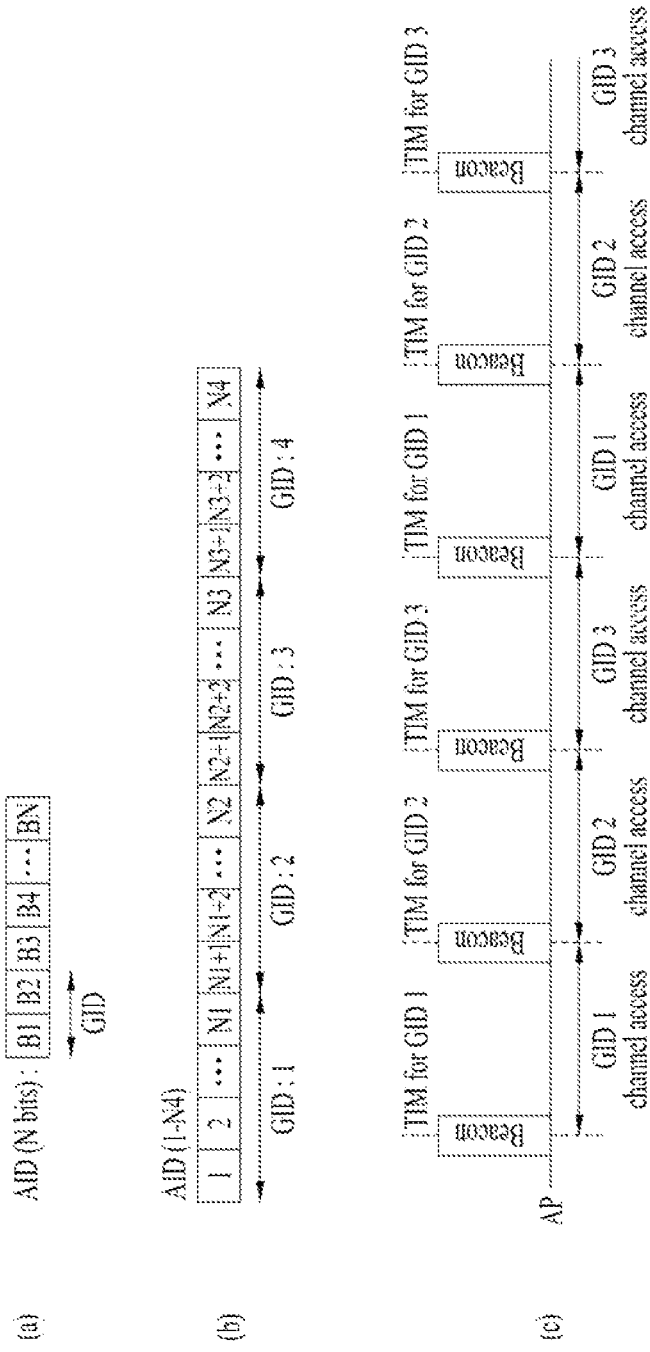
FIG. 13 is a diagram for explaining a group-based AID.

In order to solve the above-mentioned problems, AIDs are divided into a plurality of groups such that data can be more efficiently transmitted using the AIDs. A designated group ID (GID) is allocated to each group. AIDs allocated on the basis of such group will hereinafter be described with reference to FIG. 13.

FIG. 13(a) is a conceptual diagram illustrating a group-based AID. In FIG. 13(a), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13(b) is a conceptual diagram illustrating a group-based AID. In FIG. 13(b), a GID may be allocated according to the position of AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 13(b) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In case of using the aforementioned group-based AIDs, channel accessg is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. A predetermined time interval in which access to only specific STA(s) is allowed may also be referred to as a Restricted Access Window (RAW).

Channel access based on GID will hereinafter be described with reference to FIG. 13(c). If AIDs are divided into three groups, the channel access mechanism according to the beacon interval is exemplarily shown in FIG. 13(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW) during a second beacon interval (or a second RAW). A TIM element used only for AIDs having GID 3 is contained in a third beacon frame, such that channel access to an STA corresponding to the AID contained in GID 3 is allowed using a third beacon interval (or a third RAW). A TIM element used only for AIDs each having GID 1 is contained in a fourth beacon frame, such that channel access to an STA corresponding to the AID contained in GID 1 is allowed using a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is periodical or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (for example, a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, a large-sized TIM is divided into small-sized blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

PPDU Frame Format

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU defined in the MAC layer, and may include data generated/used in a higher layer. A PPDU TAIL bit may allow the encoder to return to a state of zero (0). The padding bit may be used to adjust the length of a data field according to a predetermined unit.

MAC PDU may be defined according to various MAC frame formats, and the basic MAC frame is composed of a MAC header, a frame body, and a Frame Check Sequence. The MAC frame is composed of MAC PDUs, such that it can be transmitted/received through PSDU of a data part of the PPDU frame format.

On the other hand, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

TXOP Truncation

When an STA which has gained access to a channel using EDCA empties a transmission queue thereof, the STA may transmit a contention free (CF)-END frame provided that a remaining time duration is sufficient for frame transmission. The STA may transmit the CF-END frame to explicitly indicate that a transmission opportunity (TXOP) thereof has ended. The TXOP is defined as a time interval during which a specific STA has the authority to initiate frame exchange on a radio medium and may be set by a start timing and a maximum interval value.

A TXOP holder that transmits the CF-END frame should not initiate any further exchange sequence within a current TXOP.

A non-AP STA, that is not the TXOP holder, should not transmit the CF-END frame.

Upon receiving the CF-END frame, an STA interprets reception of the CF-END frame as NAV reset. That is, the STA may reset an NAV timer to 0 at the end timing of a data unit (e.g. a PPDU) including the CF-END frame.

If an AP receives the CF-END frame having the same BSSID as a BSSID thereof, the AP may respond by transmitting the CF-END frame after an SIFS time.

Transmission of a single CF-END frame by the TXOP holder may reset the NAV of STAs hearing the TXOP holder. Whereas STAs cannot hear the CF-END frame causing NAV reset, there may be other STAs capable of hearing transmission of a TXOP responder that has reset an NAV (e.g. in a situation of a hidden node). These STAs are prohibited from contending for a medium until an original NAV reservation expires.

Figure 14:
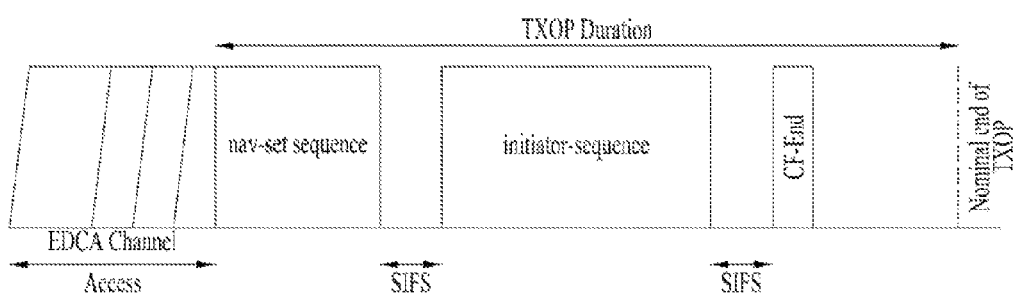
FIG. 14 is a diagram for explaining an example of TXOP truncation.

FIG. 14 is a diagram for explaining an example of TXOP truncation.

An STA may access a medium using EDCA. Next, the STA may transmit an NAV-set sequence (e.g. RTS/CTS). After an SIFS, the STA may transmit an initiator sequence and thus transmission and reception of multiple PPDUs between a TXOP holder and a TXOP responder may be performed. If the TXOP holder has no more data suitable for transmission within a TXOP at the end of a PPDU transmission/reception sequence, the TXOP holder STA may truncate the TXOP by transmitting a CF-END frame.

Upon receiving the CF-END frame, STAs may reset NAVs thereof and start contention for a medium without additional delay.

As described above, if the STA which has obtained the TXOP has no more data to be transmitted, the TXOP holder (or owner) may truncate the TXOP by broadcasting the CF-END frame. Upon receipt of the CF-END frame, the STAs may reset the NAVs and resume channel access (or contention for a channel) after the CF-END frame.

As coverage serviced by a WLAN increases (e.g. a WLAN system providing a service up to 1 km or more), a hidden node situation may frequently occur. In the hidden node situation, the CF-END frame transmitted by the TXOP holder may not be heard by other STAs.

Therefore, even when the TXOP holder truncates the TXOP by transmitting the CF-END frame, a situation may occur in which some of other STAs are not aware that the TXOP has been truncated and defer transmission thereof while waiting for the currently set TXOP to end.

To solve such a problem, the AP which has received the CF-END frame transmitted by the TXOP holder may broadcast the CF-END frame once more so that the AP may inform other STAs that fail to hear the CF-END frame transmitted by the TXOP holder of TXOP truncation. However, this scheme increases overhead of the CF-END frame.

Figure 15:
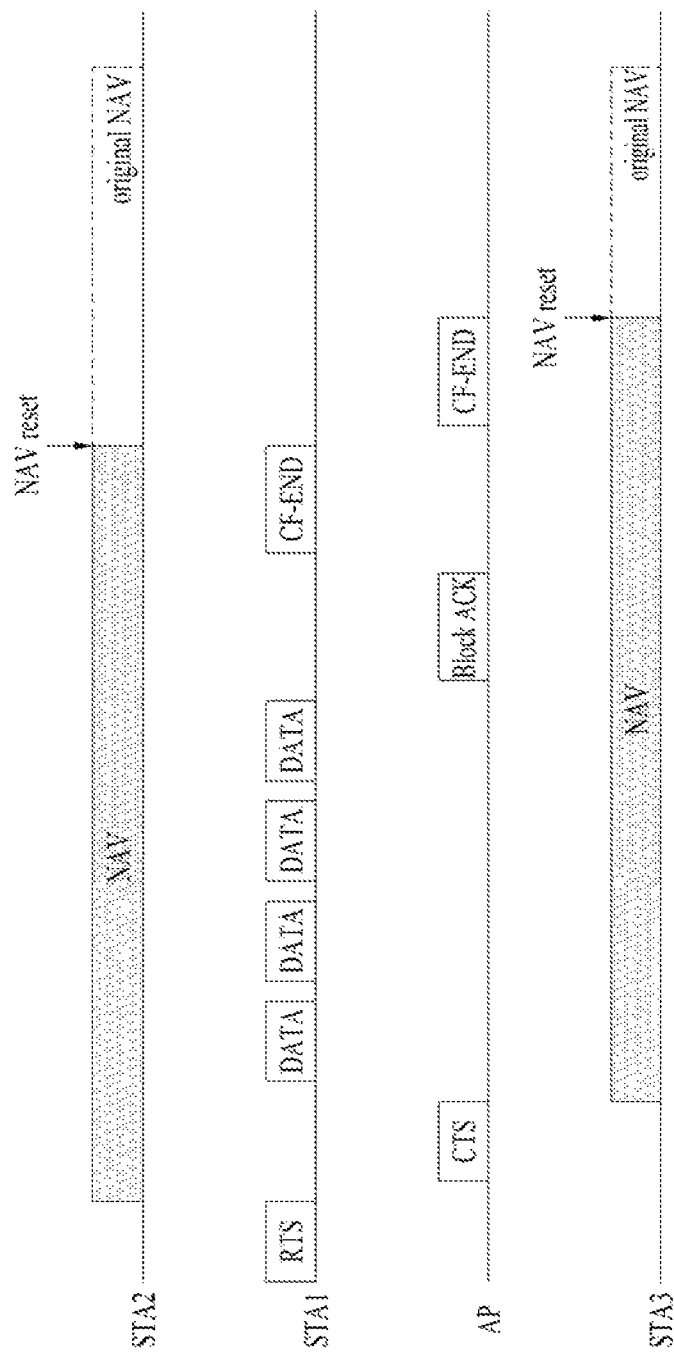
FIG. 15 is a diagram for explaining an example of TXOP truncation in a hidden node environment.

FIG. 15 is a diagram for explaining an example of TXOP truncation in a hidden node environment.

In the example of FIG. 15, it is assumed that STA3 is a hidden node of STA1. In other words, a situation is assumed in which STA2 can hear transmission of STA1 but cannot hear transmission of STA3.

STA1 may transmit and receive an NAV-set sequence (e.g. RTS/CTS) with an AP so that other STAs may set NAVs. Here, STA2 may hear RTS of STA1, may set an NAV based on a duration field of RTS, and may be prohibited from accessing a medium access (or accessing a channel) during the set NAV duration. Meanwhile, STA3 cannot head RTS of STA1 and may set an NAV by hearing CRS of the AP.

STA1 may be a TXOP holder and may exchange a data frame with the AP. In the example of FIG. 15, STA1 may transmit a plurality of data frames during a TXOP and receive a block ACK frame from the AP in response to the data frames. A time interval between the data frames may be an SIFS. The AP may transmit the block ACK frame after an SIFS since STA1 has transmitted the last data frame.

A block ACK mechanism is a scheme of providing an ACK response to a plurality of MAC packet date units (MPDUs) as one block ACK frame, instead of providing an individual ACK response per MPDU. The block ACK frame may include a block ACK bitmap and each bit of the bitmap may indicate reception success/failure of one MPDU.

If STA1 which has received the block ACK frame has no data to be transmitted any more, STA1 may transmit a CF-END frame. In this case, STA2 may recognize that a TXOP of STA1 has been truncated by hearing the CF-END frame of STA1 and may reset an NAV. However, since STA3 cannot hear the CF-END frame of STA1, STA3 does not reset the NAV and waits for the TXOP to be truncated. To solve this, the AP which has received the CF-END frame of STA1 may broadcast the CF-END frame once more. Then, STA3 which has heard the CF-END frame from the AP may be aware of TXOP truncation and may reset the NAV.

In the scheme as in FIG. 15, since the AP transmits the CF-END frame once more, signaling overhead increases and use efficiency of overall system resources is degraded.

Improved TXOP Truncation

The present invention proposes a method for adding function of the CF-END frame to a preamble of a frame in order to reduce overhead of the CF-END frame. For example, in a PLCP SIG field of a frame, 1-bit indication information indicating TXOP end may be defined and used. Then, other STAs (or third party STAs) may be aware of TXOP truncation of a specific STA by hearing only a preamble of a frame transmitted by the specific STA.

A TXOP-END bit proposed in the present invention may be included in the PLCP SIG field. For example, if the TXOP-END bit has a first value (e.g. 0), this may indicate that a TXOP is not truncated and is maintained and if the TXOP-END bit has a second value (e.g. 1), this may indicate that the TXOP is truncated.

As a detailed example, an STA which has received (or heard) a frame having the TXOP-END bit of the PLCP SIG frame set to 1 may reset a currently set NAV and may newly set the NAV based on a duration field of the frame having the TXOP-END bit set to 1.

In a scheme using a conventional CF-END frame, tan NAV is reset at a timing receiving the CF-END frame. However, according to the present invention, the NAV is not reset immediately when a frame having a TXOP-END bit set to 1 is received but a channel access restriction period is further prolonged according to a newly set NAV based on a value of a duration field of the frame.

Upon receiving the frame having the TXOP-END bit of the PLCP SIG field set to 0, the STA may maintain the currently set NAV.

Figure 16:
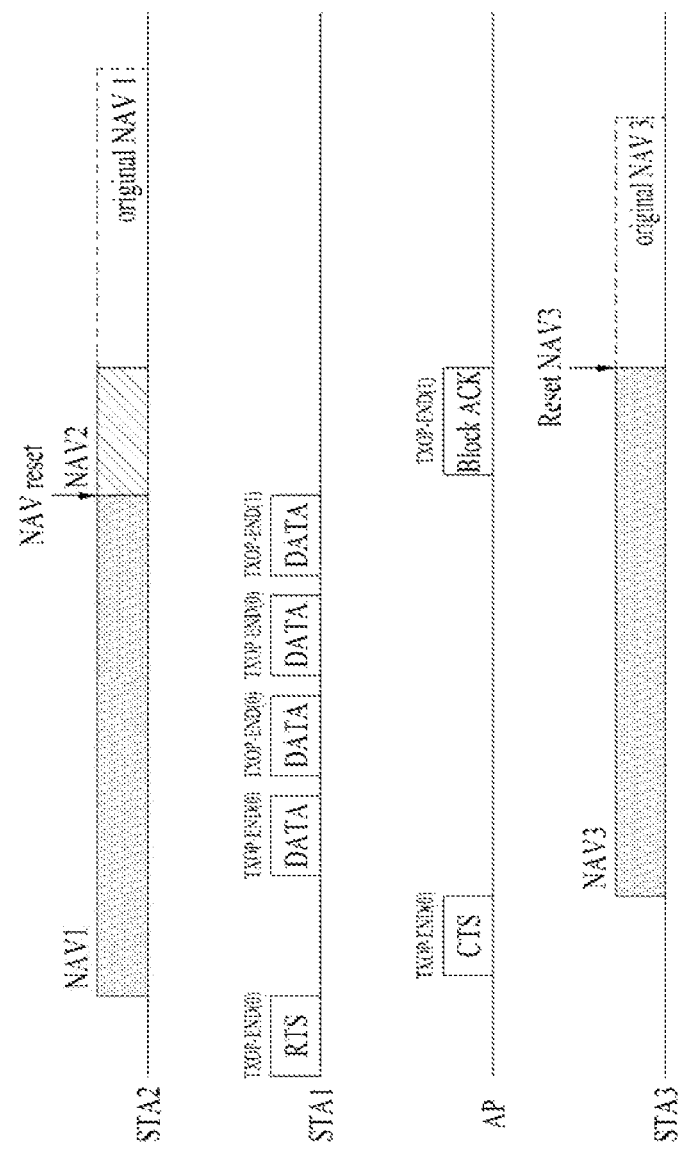
FIG. 16 is a diagram for explaining a TXOP truncation operation using a TXOP-END bit according to an example of the present invention.

FIG. 16 is a diagram for explaining a TXOP truncation operation using a TXOP-END bit according to an example of the present invention.

In the example of FIG. 16, it is assumed that STA3 is a hidden node of STA1.

STA1 which has obtained a TXOP after channel access using EDCA may transmit an RTS frame to an AP. STA2 which has heard the RTS frame may set NAV1 based on a duration field in the RTS frame. Generally, the duration field included in the RTS frame may be set to a maximum value of the TXOP. Meanwhile, since STA3 is a hidden node of STA1, STA3 cannot hear the RTS frame of STA1 and thus does not set an NAV.

Upon receipt of the RTS frame of STA1, the AP may transmit a CTS frame in response to the RTS frame. STA3 may hear the CTS frame from the AP and set NAV3 based on the value of a duration field included in the CTS frame.

STA1 may transmit a plurality of data frames in the TXOP to the AP. Here, a TXOP-END bit of the lastly transmitted data frame may be set to 1. Upon hearing the data frame, a TXOP-END bit of which is set to 1, transmitted by STA1, STA2 may reset an NAV which has been set (i.e. NAV1 which has been set based on the value of the duration field of the RTS frame) and may newly set the NAV based on the value of a duration field of the data having the TXOP-END bit set to 1. In FIG. 6, this NAV is indicated as NAV2. For example, the value of the duration field of the frame, the TXOP-END bit of which is set to 1, may be set to time length corresponding to block ACK frame transmission time plus an SIFS (i.e. the length of NAV1 in FIG. 16).

Since STA1 indicates TXOP truncation through the TXOP-END bit of the last data frame, the TXOP-END bit of a response frame (e.g. block ACK frame) of the AP may also be set to 1. Upon hearing the response frame transmitted by the AP, STA3 may reset an NAV which has been set (i.e. NAV3 which has set based on the value of the duration field of the CTS frame) according to the response frame and may newly set the NAV based on the value of the duration field of the response frame having the TXOP-END bit set to 1. In the example of FIG. 16, the value of the duration field of the block ACK frame is set to 0. Then, STA3 may not additionally set the NAV after resetting NAV3.

Definition and Use of Response Frame Type Field

Even though a data frame transmitted by a specific STA can be heard by other neighboring STAs, the STAs may not correctly receive an MPDU of the frame in some cases. For example, the STAs may not correctly receive the MPDU transmitted by the specific STA in the case of a high data rate. This is because a probability of receiving data is high in the case of a low data rate although a channel state is not good, whereas the STAs cannot receive data due to some errors in the case of a high data rate.

In the above-described example of FIG. 16, when the data rate of the frame having the TXOP-END bit set to 1 is high, other STAs may not receive the MPDU of the frame. For example, if the data rate of the fourth data frame, the TXOP-END bit of which is set to 1, is high, STA2 may not receive the MPDU of the fourth data frame. If STA2 cannot receive the MPDU, STA2 cannot confirm a duration field included in a MAC header in the MPDU. Accordingly, STA2 which has not received the MPDU (especially, the duration field in the MAC header) transmitted by STA1 may not newly set NAV2 shown in FIG. 16. However, since a TXOP-END bit included in a PLCP SIG field is not included in the MPDU, STA2 may receive the PLCP SIG field even upon failing to receive the MPDU and therefore, may correctly reset NAV1 (i.e. TXOP truncation). In this case, since STA2 has no newly set NAV after resetting NAV1, STA2 may perform channel access at a time when a block ACK frame is transmitted to STA1 in FIG. 16 by recognizing that the TXOP of STA1 has been truncated.

To solve such a problem, even when other STAs cannot correctly hear (or receive) the MPDU, rough time length for transmission and reception of a response frame for a corresponding frame may be derived. Then, upon receiving a frame having a TXOP-END bit set to 1, other STAs may update the NAV corresponding to time length up to the response frame for the corresponding frame (i.e. resetting of an existing NAV and setting of a new NAV based on information about the time length).

To this end, the present invention proposes a method for indicating information about the type of a response frame for a corresponding frame through a PLCP SIG field.

The type of the response frame may be one of No ACK, Normal ACK, and Block ACK. To express such three types, type information of the response frame included in the PLCP SIG field may be defined by 2 bits.

For example, if a response frame type field included in a specific frame indicates No ACK, other STAs receiving the specific frame may determine that there is no frame transmitted in response to the specific frame.

For example, if the response frame type field included in the specific frame indicates Normal ACK, other STAs receiving the specific frame may determine that an ACK frame will be transmitted after the specific frame.

For example, if the response frame type field included in the specific frame indicates Block ACK, other STAs receiving the specific frame may determine that a block ACK frame will be transmitted after the specific frame.

In this way, other STAs which have recognized the type of the response frame from the response frame type field included in the PLCP SIG field of the specific frame may roughly estimate the value of a duration field (i.e. time length that other STAs should set as a NAV) from the response frame type field even when the value of the duration field included in a MAC header cannot be identified due to occurrence of an error in an MPDU of the specific frame.

For example, if the response frame type field included in the specific frame indicates No ACK, other STAs receiving the specific frame may estimate that the value of the duration field of the MAC header of the MPDU of the specific frame is 0.

For example, if the response frame type field included in the specific frame indicates Normal ACK, other STAs receiving the specific frame may estimate that the value of the duration field of the MAC header of the MPDU of the specific frame is time length corresponding to ACK frame transmission time plus an SIFS.

For example, if the response frame type field included in the specific frame indicates Block ACK, other STAs receiving the specific frame may estimate that the value of the duration field of the MAC header of the MPDU of the specific frame is time length corresponding to block ACK frame transmission time plus an SIFS.

If an STA can confirm both the response frame type field in the PLCP SIG field on the specific frame and the duration field in the MAC header, the STA may set an NAV based on the value of the duration field. However, when the MAC header cannot be confirmed due to occurrence of an error in the MPDU, the STA may set the NAV according to time length estimated based on the response frame type field in the PLCP SIG field. Alternatively, even when the duration field is not included in the MPDU in the specific frame or the duration field is present, an STA receiving the specific frame may set the NAV based on the response frame type field in the PLCP SIG field of the specific frame.

According to the examples proposed in the present invention, a TXOP truncation operation may be performed using one or more of a TXOP-END field (1-bit size) newly defined in a PLCP SIG field and a response frame type field (2-bit size). For instance, the TXOP truncation operation can be efficiently performed according to examples proposed in the present invention even though the CF-END frame is not used.

FIG. 17 is a diagram for explaining an operation using a response type field according to an example of the present invention.

In the example of FIG. 17, a data frame is illustrated in the form including a SIG field, a MAC header (MH), and a Data field. However, the data frame is not restricted thereto and may include some of the SIG field, the MH, and the Data field. The present invention proposes that the response frame type field be included in the PLCP SIG field and may be applied to various frame formats which are not disclosed in this document.

In the example of FIG. 17(*a*), if the response frame type field included in the SIG field of the data frame is set to a value indicating No ACK, another STA (e.g. STA2) receiving (or hearing) the data frame of STA1 may determine that an ACK frame for STA1 will not be transmitted after the data frame. Accordingly, STA2 may estimate that the value of a duration field in the MH will be 0 and may set an NAV based on the value of the duration field.

In the example of FIG. 17(*b*), if the response frame type field included in the SIG field of the data frame is set to a value indicating ACK, another STA (e.g. STA2) receiving (or hearing) the data frame of STA1 may determine that the ACK frame for STA1 will be transmitted after an SIFS since the data frame has been ended. Accordingly, STA2 may roughly estimate that the value of the duration field in the MH will indicate time length corresponding to ACK frame length plus an SIFS length and may set the NAV based on the value of the duration field.

In the example of FIG. 17(c), if the response frame type field included in the SIG field of the data frame is set to a value indicating Block ACK (BA), another STA (e.g. STA2) receiving (or hearing) the data frame of STA1 may determine that a block ACK frame for STA1 will be transmitted after an SIFS since the data frame has been ended. Accordingly, STA2 may roughly estimate that the value of the duration field in the MH will indicate time length corresponding to block ACK frame length + an SIFS and may set the NAV based on the value of the duration field.

Therefore, protection for a current TXOP can be reinforced using the response frame type field (e.g. 2-bit size) in the PLCP SIG field. That is, according to a conventional operation in which the response frame type field is not defined, if STA2 cannot confirm the duration field due to occurrence of an error in the MPDU of a specific frame for STA1, STA2 may estimate that a duration will be 0, reset the NAV, and initiate channel access exceeding the TXOP of STA1. According to the present invention, a rough duration value may be estimated from the response frame type field of the PLCP SIG field and the NAV may be set according to the duration value. Therefore, STA2 can be prevented from initiating channel access in the TXOP of STA1.

Case of MU-MIMO

When an AP performs MU-MIMO transmission to a plurality of STAs, the response frame type field and/or the TXOP-END bit proposed in the present invention may be included in an SIG-A field of a PLCP header which can be commonly received by all STAs participating in MU-MIMO.

The SIG-A field of the PLCP header may include common information for MU-MIMO. Accordingly, in order for all STAs to receive the common information, beamforming or precoding (operation for allowing signals to be directed in a specific direction (or to form beams)) is not applied to the SIG-A field.

Figure 18:
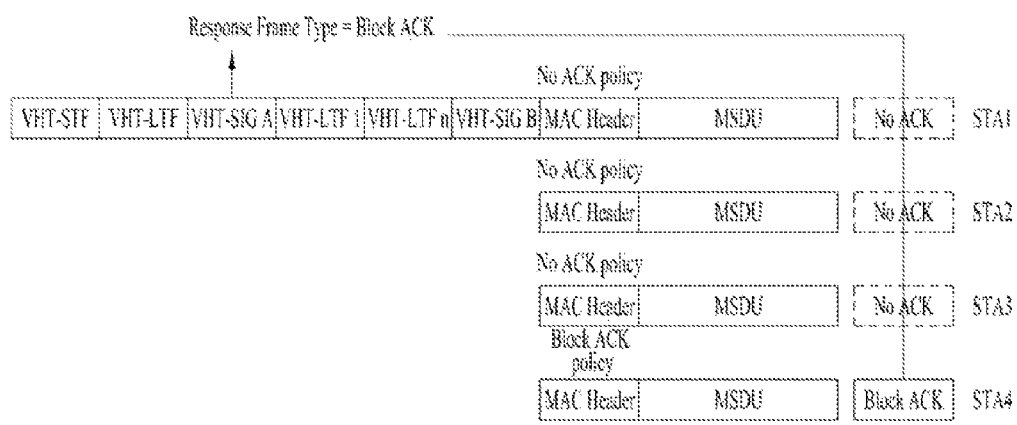
FIG. 18 is a diagram for explaining operation using a response type field in MU-MIMO according to an example of the present invention.

FIG. 18 is a diagram for explaining operation using a response type field in MU-MIMO according to an example of the present invention.

If an AP simultaneously transmits a PPDU to a plurality of STAs, since the AP cannot simultaneously receive ACK or Block ACK from the plural STAs, the type of a frame to be transmitted subsequently after a data frame may differ according to each STA.

For example, as illustrated in FIG. 18, the AP may request that only one STA (e.g. STA4) among STAs participating in MU-MIMO transmit immediate Block ACK. Alternatively, the AP may request the other STAs (e.g. STA1, STA2, and STA3) to transmit Block ACK in the case of the Block ACK request. Therefore, an ACK policy for the other STAs (e.g. STA1, STA2, and STA3) may be set to No ACK and the ACK policy for STA4 may be set to Block ACK. during transmission of an MU-MIMO PPDU In the above MU-MIMO operation, the response frame type field included in the SIG-A frame may be set according to a response frame type having the longest transmission time among response frame types set for the plural STAs. In the above example, since No ACK set for STA1, STA2, and STA3 correspond to transmission time 0, the Block ACK set for STA4 corresponds to the response frame type having the longest transmission time. Accordingly, the response frame type field may be set to a value indicating Block ACK.

Although not illustrated in FIG. 18, for example, when No ACK policy is set for all of STA1 to STA4, since the response frame type having the longest transmission time also corresponds to No ACK, the response frame type field of the PLCP SIG-A field may be set to a value indicating No ACK. In addition, for example, when an ACK policy is set for STA1 and No ACK policy is set for the other STAs, the response frame type having the longest transmission time corresponds to ACK and therefore the response frame type field of the PLCP SIG-A field may be set to a value indicating ACK.

Additional Embodiment for Classification of Response Frame Type

Although the above-described response frame type has been simply classified into three types: No ACK, ACK, and Block ACK, this is purely exemplary. The response frame type proposed in the present invention may be classified into one or more of a first type related to a No response, a second type related to a short response, a third type related to a normal response, and a fourth type related to a long response. In the above example, No ACK may correspond to the first type, and ACK may correspond to the second type, Block ACK may correspond to the third type. Alternatively, in the above example, No ACK may correspond to the first type, ACK may correspond to the third type, and Block ACK may correspond to the fourth type. In summary, the present invention proposes that the type of the response frame be classified according to the length of the response frame and a detailed type may be appropriately determined.

As a detailed example, the principle of the present invention is identically applicable even when the response frame type proposed in the present invention is classified in four types as follows.

For example, the response frame type may be classified into four types: a No response, a null-data packet (NDP) control response, a normal control response, and a long response. That is, the response frame type field (e.g. 2-bit size) in the SIG field of a specific data frame may be set to a value indicating one of the above four cases according to the type of a response frame to be transmitted and received subsequently after the specific data frame. By classification according to the above-described general proposal of the present invention, the No response may correspond to the first type, the NDP control response may correspond to the second type, the normal control response may correspond to the third type, and the long response may correspond to the fourth type.

Even when the response frame type is classified as described above, the principle proposed in the present invention may be applied. In other words, even when a second STA cannot confirm the value of the duration field of the MAC header due to occurrence of an error in the MPDU of a specific frame for a first STA, the second STA may estimate a rough value of the duration field from the response frame type field included in the PLCP SIG field (or SIG-A field in the case of MU-MIMO) of the specific frame for the first STA and may properly set an NAV (i.e. defer medium access or channel access) according to the value of the duration field.

Figure 19:
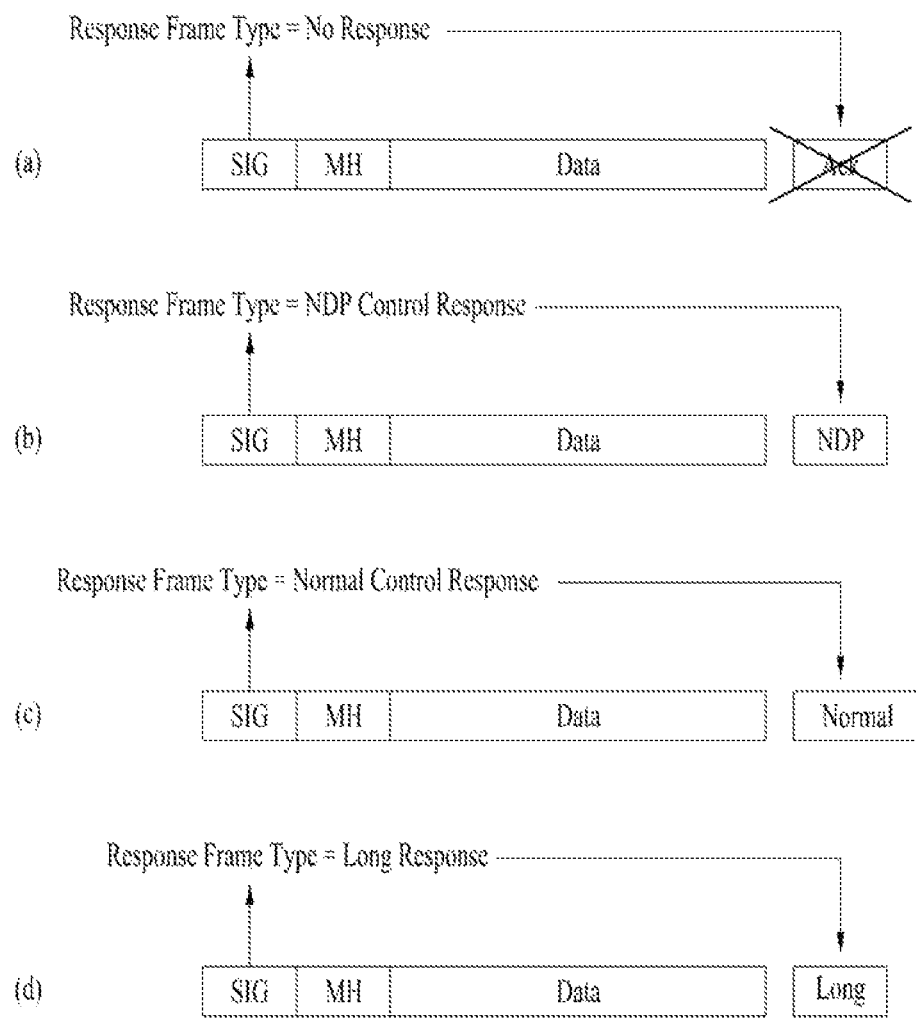
FIG. 19 is a diagram for explaining operation using a response type field according to another example of the present invention.

FIG. 19 is a diagram for explaining operation using a response type field according to another example of the present invention.

Specifically, in the example of FIG. 19(a), if a response frame type field included in a SIG field of a data frame for STA1 is set to a value indicating the first type (e.g. No response), another STA (e.g. STA2) receiving (or hearing) the data frame of STA1 may determine that there is no transmission of the response frame for STA1 after the data frame. Therefore, STA2 may estimate that the value of a duration field in an MH will be 0 and may set an NAV based on the value of the duration field.

In the example of FIG. 19(*b*), if a response frame type field included in a SIG field of a data frame for STA1 is set to a value indicating the second type (e.g. NDP control response), another STA (e.g. STA2) receiving (or hearing) the data frame of STA1 may determine that there is transmission of an NDP control response frame for STA1 after an SIFS since the data frame has been ended. Therefore, STA2 may roughly estimate that the value of a duration field in an MH will indicate time length corresponding to NDP frame length (i.e. PLDP header transmission time)+SIFS and may set an NAV based on the value of the duration field.

In the example of FIG. 19(*c*), if the response frame type field included in a SIG field of a data frame for STA1 is set to a value indicating the third type (e.g. normal control response), another STA (e.g. STA2) receiving (or hearing) the data frame of STA1 may determine that there is transmission of a normal control response frame for STA1 after an SIFS since the data frame has been ended. Therefore, STA2 may roughly estimate that the value of a duration field in an MH will indicate time length corresponding to normal response frame length (e.g. a CTS frame, an ACK frame, or a block ACK frame transmission time)+SIFS and may set an NAV based on the value of the duration field.

In the example of FIG. 19(*d*), if the response frame type field included in a SIG field of a data frame for STA1 is set to a value indicating the fourth type (e.g. long response), another STA (e.g. STA2) receiving (or hearing) the data frame of STA1 may determine that there is transmission of a long response frame for STA1 after an SIFS time since the data frame has been ended. Therefore, STA2 may roughly estimate that the value of a duration field in an MH will indicate time length corresponding to long response frame length (e.g. MAX_PPDU transmission time)+SIFS and may set an NAV based on the value of the duration field.

Thus, protection for the TXOP can be further reinforced by classifying in more detail the type of a response frame indicated by a response frame indication field in a PLCP SIG field.

In addition, when the AP supports MU-MIMO operation, the response frame type field may be included in a SIG-A field of a PLCP header that all STAs can commonly receive (i.e. PLCP header to which beamforming or precoding is not applied). The response frame type field included in the SIG-A field may be set to a value indicating a response frame having the longest transmission length among response frame types set with respect to a plurality of STAs participating in MU-MIMO.

Figure 20:
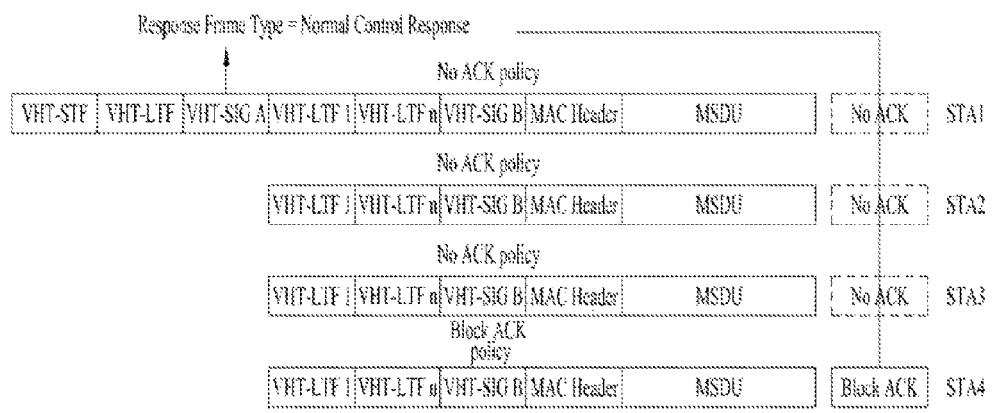
FIG. 20 is a diagram for explaining operation using a response type field of MU-MIMO according to another example of the present invention.

FIG. 20 is a diagram for explaining operation using a response type field of MU-MIMO according to another example of the present invention.

According to conventionally defined operation, a response frame of an STA receiving a data frame may be determined by an ACK policy field of a QoS control field of a MAC header of the data frame. The ACK policy field may be set to values indicating No ACK, Normal ACK, Block ACK, etc.

The present invention proposes that the ACK policy field be included not in a MAC header but in a PLCP SIG field. Then, since the QoS control field may be omitted from the MAC header, MAC efficiency can be raised.

In the case of MU-MIMO, since the ACK policy field is individually set with respect to each STA, the ACK policy field should be commonly set for STAs participating in MU-MIMO and therefore the ACK policy field may be included in a PLCP SIG-B field unlike the response frame type field included in a PLCP SIG-A field. Since the SIG-B field of the PLCP header includes individual transmission parameters as in a modulation and coding scheme (MCS) for each STA, beamforming or precoding may be applied for transmission.

When an AP simultaneously transmits a PPDU to a plurality of STAs, since the AP cannot simultaneously receive ACK or Block ACK from the plural STAs, the type of a frame to be transmitted subsequently after a data frame may differ according to each STA.

For example, as illustrated in FIG. 20, the AP may immediately request that only one STA (e.g. STA4) among STAs participating in MU-MIMO transmit Block ACK. Alternatively, the AP may request the other STAs (e.g. STA1, STA2, and STA3) to transmit Block ACK in the case of the Block ACK request. Therefore, an ACK policy for the other STAs (e.g. STA1, STA2, and STA3) may be set to no ACK and the ACK policy for STA4 may be set to Block ACK during transmission of an MU-MIMO PPDU.

To this end, an ACK policy (e.g. 1-bit size) may be included in the SIG-B field of the PLCP header so that the ACK policy can be designated per STA.

In the above MU-MIMO operation, the response frame type field included in the SIG-A frame may be set according to a response frame type having the longest transmission time among response frame types set for a plurality of STAs. In the above example, since No ACK set for STA1, STA2, and STA3 corresponds to transmission time 0, Block ACK set for STA4 corresponds to the response frame type having the longest transmission time. Accordingly, the response frame type field may be set to a value indicating Block ACK.

As indicated in FIG. 20, when the AP transmits an MU-MIMO PPDU to STA1, STA2, STA3, and STA4, the AP may individually set no ACK policy with respect to each of STA1, STA2, and STA3 and may set Block ACK policy with respect to STA4. To this end, the AP may set ACK policy to each STA through an ACK policy field of a VHT-SIG-B field. Moreover, the response frame type field included in a VHT-SIG-A field may be set to a normal control response.

Additionally, the SIG-B field in an MU frame (e.g. a data field used in MU-MIMO) may include user-specific information. The following Table 1 exemplarily shows fields constituting the SIG-B field in the MU frame. In addition, Table 1 exemplarily shows various parameters applied to a PPDU per bandwidth (BW) 2, 4, 8, or 16 MHz.

TABLE 1

|  | BW | | | |
| --- | --- | --- | --- | --- |
|  | 2 MHz | 4 MHz | 8 MHz | 16 MHz |
| MCS | 4 | 4 | 4 | 4 |
| ACK Policy | 1 | 1 | 1 | 1 |
| Tail | 6 | 6 | 6 | 6 |
| CRC | 8 | 8 | 8 | 8 |
| Reserved | 7 | 8 | 10 | 10 |
| Total | 26 | 27 | 29 | 29 |

In Table 1, the MCS field indicates an MCS value of a PPDU transmitted in the form of an MU frame per user.

The ACK policy field is a field included to signal an ACK policy of an STA receiving the MU frame through a PLCP header.

The Tail bit may be used to return an encoder to state 0.

The cyclic redundancy check (CRC) field may be used for error detection in an STA receiving the MU frame.

Figure 21:
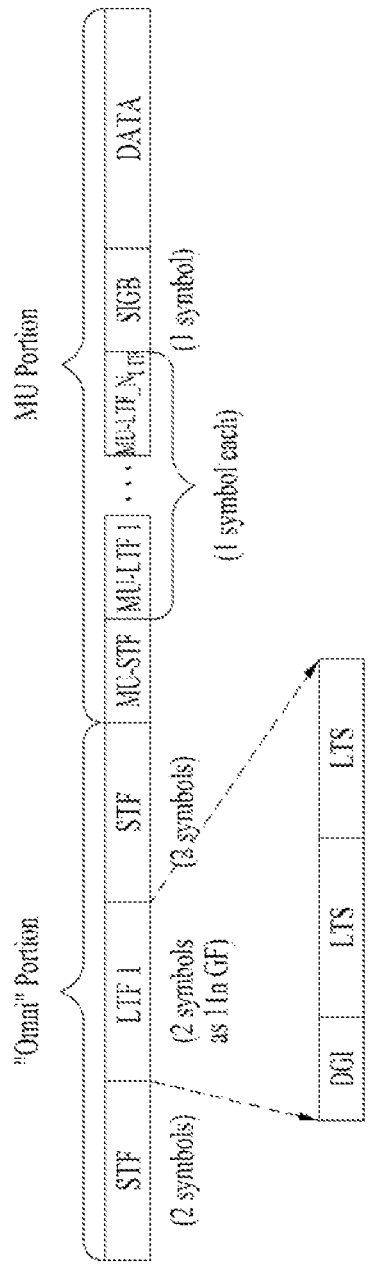
FIG. 21 is a diagram exemplarily illustrating a single-user (SU) or multi-user (MU) frame format.

FIG. 21 is a diagram exemplarily illustrating a single user (SU) or MU frame format.

In the example of FIG. 21, STF, LTF, and SIGA fields correspond to an "omni" portion indicating omnidirectional transmission to all STAs and may be transmitted without applying beamforming or precoding.

Meanwhile, MU-STF, MU-LTF1, . . . , MU-LTF_NLTF, SIGB fields following the SIGA field are user-specifically transmitted and beamforming may be applied thereto for transmission. In the example of the frame format of FIG. 21, an MU portion may include MU-STF, MU-LTF(s), SIGB, and Data fields.

In the "omni" portion, the STF, LTF1, SIGA fields may be transmitted as a single stream with respect to the respective subcarriers. This may be expressed by the following equation.

$$[x_k]_{N_{TX}\times 1} = [Q_k]_{N_{TX}\times 1} d_k \qquad \text{[Equation 1]}$$

In Equation 1, k denotes a subcarrier (or tone) index, xk denotes a signal transmitted on subcarrier k, and NTX denotes the number of transmit antennas. Qk denotes a column vector for encoding (e.g. spatial-mapping) a signal transmitted on subcarrier k and dk indicates data input to an encoder. In Equation 1, a cyclic shift delay (CSD) in the time domain may be applied to Qk. The CSD in the time domain has the meaning of phase rotation or phase shift in the frequency domain. Accordingly, Qk may include a phase shift value in tone k generated by the CSD in the time domain.

When the frame format as illustrated in the example of FIG. 21 is used, the STF, LTF1, SIGA fields may be received by all STAs and each of the STAs may decode a SIGA field through channel estimation based on the STF and LTF1 fields.

The SIGA field may include information about length/duration, channel bandwidth, number of spatial streams, and the like. The SIGA field has a length of two OFDM symbols. One OFDM symbol uses binary phase shift keying (BPSK) modulation with respect to 48 data tones and therefore 24-bit information can be expressed on OFDM symbol. Then, the SIGA field may include 48-bit information.

The following Table 2 shows bit assignment of the SIGA field for each of an SU case and an MU case.

TABLE 2

|  | SU | MU |
| --- | --- | --- |
| SU/MU Indication | 1 | 1 |
| Length/Duration | 9 | 9 |
| MCS | 4 |  |
| BW | 2 | 2 |
| Aggregation | 1 |  |
| STBC | 1 | 1 |
| Coding | 2 | 5 |
| SGI | 1 | 1 |
| GID |  | 6 |
| Nsts | 2 | 8 |
| PAID | 9 |  |
| Response frame indication | 2 | 2 |
| Reserved | 3 | 3 |
| CRC | 4 | 4 |
| Tail | 6 | 6 |
| Total | 48 | 48 |

In Table 2, the SU/MU Indication field is used to distinguish between an SU frame format and an MU frame format.

The Length/Duration field indicates the number of OFDM symbols (i.e. duration) or the number of bytes (i.e. length) of a frame. In an SU frame, when the value of Aggregation field is 1, the Length/Duration field is interpreted as a Duration field. Meanwhile, when the value of the aggregation field is 0, the Length/Duration field is interpreted as a Length field. In an MU frame, since the Aggregation field is not defined and the MU frame is configured to always apply aggregation, the Length/Duration field is interpreted as the Duration field.

The MCS field indicates an MCS used for PSDU transmission. The MCS field is transmitted through the SIGA field only in the SU frame. Upon receiving the SU frame, other STAs may calculate the duration of a currently received SU frame based on the length value of the Length/Duration field and the value of the MCS field (in the case of SU beamformed frame in which the Aggregation field indicates 0). Meanwhile, in the MU frame, the MCS field is included not in the SIGA field but in an SIGB field carrying user-specific information and an MCS may be independently applied to each user.

The BW field indicates the channel bandwidth of a transmitted SU frame or MU frame. For example, the BW field may be set to a value indicating one of 2 MHz, 4 MHz, 8 MHz, 16 MHz, and 8+8 MHz.

The Aggregation field indicates whether PSDUs are aggregated in the form of an MPDU (i.e. an A-MPDU). If the Aggregation field is set to 1, this indicates that the PSDUs are aggregated in the form of the A-MPDU for transmission. If the Aggregation field is set to 0, this represents that the PSDUs are not aggregated for transmission. In the MU frame, since the PSDUs are always transmitted in the form of the A-MPDU, the Aggregation field does not need to be signaled and therefore the Aggregation field is not included in the SIGA field.

The space-time block coding (STBC) field indicates whether STBC is applied to the SU frame or the MU frame.

The Coding field indicates a coding scheme used for the SU frame or the MU frame. A binary convolutional code (BCC) or low density parity check (LDPC) scheme may be used for the SU frame. In the MU frame, an independent coding scheme per user may be applied and, to support this scheme, the Coding field may be defined by a size of 2 bits or more.

The short guard interval (SGI) field indicates whether an SGI is used for PSDU transmission of the SU frame or the MU frame. If the SGI is used for the MU frame, this may indicate that the SGI is commonly applied to all users belonging to an MU-MIMO group.

The group identification (GID) field indicates MU group information in the MU frame. In the SU frame, since a user group does not need to be defined, the GID field is not included in the SIGA field.

The number of space-time streams (Nsts) field indicates the number of spatial streams in the SU frame or the MU frame. In the MU frame, the Nsts field indicates the number of spatial streams for each of STAs belonging to an MU group and, for this, 8 bits are needed. Specifically, a maximum of four users may be included in the MU group and a maximum of four spatial streams can be transmitted to each user. To correctly support this, 8 bits are needed.

The partial AID (PAID) field indicates the ID of an STA for identifying a reception STA in the SU frame. In an uplink frame, the value of a PAID is composed of part of BSSIDs. In a downlink frame, the value of the PAID may be composed of a result of hashing an AID of an STA.

The Response frame indication field indicates the type of a response frame transmitted after the SU frame or the MU frame. As proposed in the present invention, the type of the response frame may be classified into three types: No ACK, Normal ACK, and Block ACK. Alternatively, the type of the response frame may be classified into four types: No Response, NDP Control Response, Normal Control Response, and Long Response.

Figure 22:
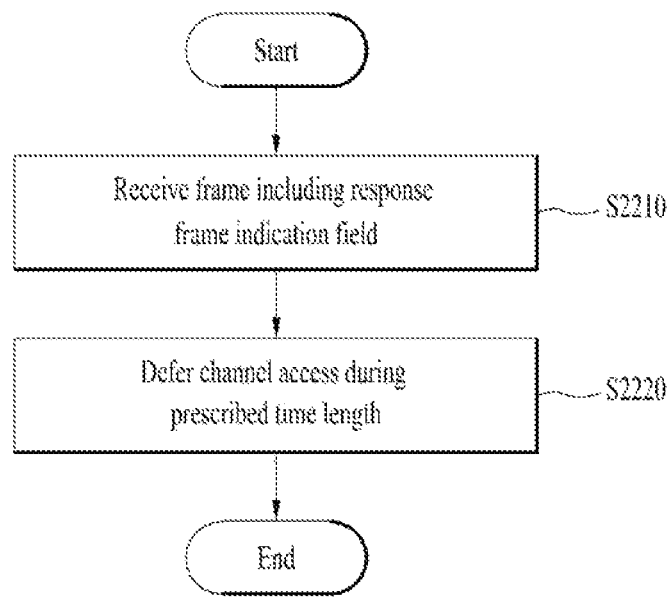
FIG. 22 is a flowchart for explaining a channel access control method according to an example of the present invention.

FIG. 22 is a flowchart for explaining a channel access control method according to an example of the present invention.

In step S2210, an STA may receive a frame including a Response frame indication field. The Response frame indication field may indicate one of various types (types classified into one or more of the above-described first to fourth types) of the response frame.

In step S2220, the STA may defer channel access during prescribed time length determined based on the Response frame indication field. For example, the STA may determine the type of the response frame according to the value of the Response frame indication field, estimate the value of a duration field of the frame, and then set an NAV value.

Although not illustrated in FIG. 22, if a TXOP-END bit in the frame is activated (e.g. set to 1), the STA may reset an NAV and set the NAV value according to the prescribed time length determined based on the type of the response frame according to the example of the present invention.

In the channel access control method of the present invention illustrated in FIG. 22, the above described various embodiments of the present invention may be independently applied or two or more embodiments thereof may be simultaneously applied.

Figure 23:
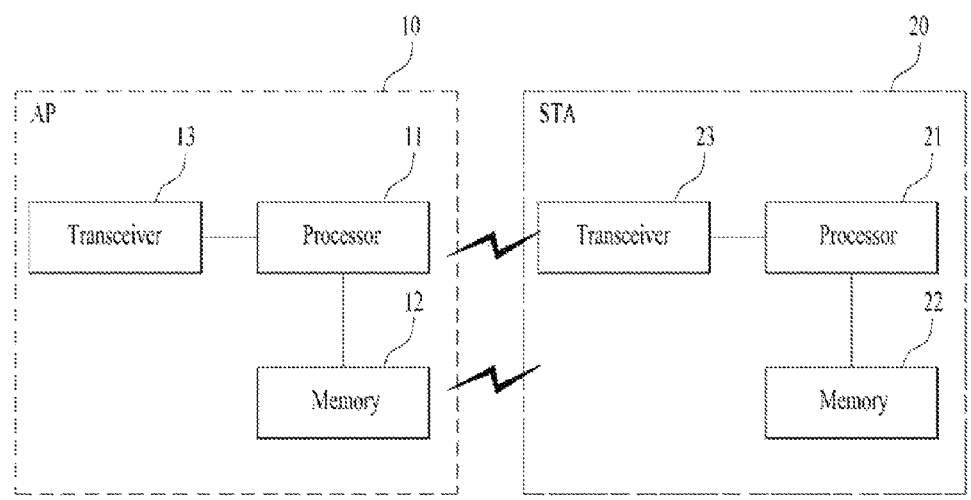
FIG. 23 is a block diagram illustrating a radio device according to an embodiment of the present invention.

FIG. 23 is a block diagram illustrating a radio device according to an embodiment of the present invention.

An AP 10 may include a processor 11, a memory 12, and a transceiver 13. An STA 20 may include a processor 21, a memory 22, and a transceiver 23. The transceivers 13 and 23 may transmit/receive radio signals and may implement a physical layer based on an IEEE 802 system. The processors 11 and 21 are connected to the transceivers 13 and 21, respectively, and may implement a physical layer and/or a MAC layer based on the IEEE 802 system. The processors 11 and 21 may be configured to perform operations according to the above described various embodiments of the present invention. Modules for implementing operations of the AP and STA according to the above described various embodiments of the present invention may be stored in the memories 12 and 22 and may be carried out by the processors 11 and 21. The memories 12 and 22 may be included in the processors 11 and 21 or may be installed at the exterior of the processors 11 and 21 to be connected by a known means to the processors 11 and 21.

The overall configurations of the AP and STA may be implemented such that above described various embodiments of the present invention may be independently applied or two or more embodiments thereof may be simultaneously applied and a repeated description is omitted for clarity.

The above-described embodiments may be implemented by various means, for example, by hardware, firmware, software, or a combination thereof.

In a hardware configuration, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the above various embodiments of the present invention have been described based on an IEEE 802.11 system, the embodiments may be applied in the same manner to various mobile communication systems.

The invention claimed is:

1. A channel access control method of a station (STA) of a wireless communication system, the method comprising:
receiving a frame, the frame including a physical layer convergence protocol (PLCP) header, the PLCP header having a PLCP signal (SIG) field, the PLCP SIG field including a transmission opportunity-end (TXOP-END) bit and a response frame indication field; and
deferring channel access of the STA during a prescribed time length determined based on the response frame indication field,
wherein when the TXOP-END bit of the frame is enabled, the STA resets a network allocation vector (NAV) of the STA.

2. The channel access control method according to claim 1, wherein the response frame indication field indicates a type of a response frame transmitted after the frame.

3. The channel access control method according to claim 1, wherein, if the frame supports multiuser-multiple input multiple output (MU-MIMO), the response frame indication field is included in a field commonly received by a plurality of STAs.

4. The channel access control method according to claim 3, wherein the field commonly received by the plurality of STAs is a PLCP SIG-A field of the PLCP SIG field.

5. The channel access control method according to claim 3, wherein the response frame indication field is set to a value indicating a response frame type having longest length among response frame types for each of the plurality of STAs.

6. The channel access control method according to claim 3, wherein an acknowledgement (ACK) policy field for each of the plurality of STAs is included in a field individually received by each of the plurality of STAs in the frame supporting MU-MIMO.

7. The channel access control method according to claim 6, wherein the field individually received by each of the plurality of STAs is a PLCP SIG-B field of the PLCP SIG field.

8. The channel access control method according to claim 2, wherein a type of the response frame includes at least one of a first type related to a No response, a second type related to a short response, a third type related to a normal response, or a fourth type related to a long response.

9. The channel access control method according to claim 8, wherein,
if the type of the response frame is the first type, the prescribed time length is set to 0,
if the type of the response frame is the second type, the prescribed time length is set to a time length corresponding to transmission time length of the PLCP header plus a short interframe space (SIFS),
if the type of the response frame is the third type, the prescribed time length is set to a time length corresponding to transmission time length of an acknowledgement (ACK) frame plus the SIFS, or
if the type of the response frame is the fourth type, the prescribed time length is set to a time length corresponding to maximum transmission time length of a PLCP packet data unit (PPDU) plus the SIFS.

10. The channel access control method according to claim 1, wherein the deferring includes resetting the NAV and setting a value of the NAV based on the prescribed time length.

11. The channel access control method according to claim 1, wherein, if a duration field included in a medium access control (MAC) header of the frame is received, the prescribed time length is determined based on the duration field rather than the response frame indication field.

12. A station (STA) for controlling channel access in a wireless communication system, the STA comprising:
a transceiver module; and
a processor,
wherein the processor is configured to receive a frame through the transceiver, the frame including a physical layer convergence protocol (PLCP) header, the PLCP header having a PLCP signal (SIG) field, the PLCP SIG field including a transmission opportunity-end (TXOP-END) bit and a response frame indication field; and defer channel access of the STA during a prescribed time length determined based on the response frame indication field, and
wherein when the TXOP-END bit of the frame is enabled, the STA resets a network allocation vector (NAV) of the STA.

13. A channel access control method of a station (STA) of a wireless communication system, the method comprising:
receiving a frame including a physical layer convergence protocol (PLCP) header, the PLCP header having a PLCP signal (SIG) field, the PLCP SIG field including a transmission opportunity-end (TXOP-END) bit; and
resetting a network allocation vector (NAV) of the STA when the TXOP-END bit of the frame is enabled.

* * * * *